Sept. 25, 1962 D. G. PHILLIPS 3,055,178
RAMJET IGNITION SYSTEM
Filed Feb. 1, 1960 2 Sheets-Sheet 1

FIG. I

INVENTOR.
DONALD G. PHILLIPS
BY
ATTORNEYS

Sept. 25, 1962  D. G. PHILLIPS  3,055,178
RAMJET IGNITION SYSTEM
Filed Feb. 1, 1960  2 Sheets-Sheet 2

INVENTOR.
DONALD G. PHILLIPS
BY
ATTORNEYS 3,055,178
RAMJET IGNITION SYSTEM
Donald G. Phillips, Woodland Hills, Calif., assignor to the United States of America as represented by the Secretary of the Air Force
Filed Feb. 1, 1960, Ser. No. 6,084
3 Claims. (Cl. 60—39.65)

This invention relates to ramjet ignition systems generally and more particularly to a controlled ignition zone in which the fuel-air mixture is initially ignited.

The extremely high velocity of air flow through the combusion chamber of a ramjet engine creates the problem of igniting a fuel-air mixture and propagating it into the main combustion mixture under the most adverse conditions. Since the efficiency of the power plant is increased when the velocity of air entering the combustion chamber is increased, it is most desirable to allow free passage of air from the diffuser section by not placing any restricting apparatus in its path. This raises the further problem of creating an area in which ignition of a fuel-air mixture can be accomplished without materially affecting the velocity of the main air stream.

The present invention provides a new and improved means for igniting a flame and propagating the main combustion mixture. This is accomplished by igniting the fuel-air mixture in a controlled, relatively quiescent zone and producing sufficient heat thereby to ignite the remainder of the combustion mixture in the main combustion chamber.

Accordingly, it is an object of the invention to provide a ramjet engine which has a controlled ignition zone for initially igniting the fuel-air mixture and thereby act as a pilot burner to ignite the remainder of the combustion mixture.

Another object of the invention is to provide a ramjet engine which utilizes a conventional spark ignition system but is so constructed as to be effective to decrease the temperature at the base of the pilot can and thus increase the useful life of the spark plug and associated lead.

A still further object of the invention is to provide a ramjet engine in which reignition in flight is feasible.

These and other objects, features and advantages of the invention will become more apparent from the following description taken in connection with the accompanying drawings wherein.

Figure 1:
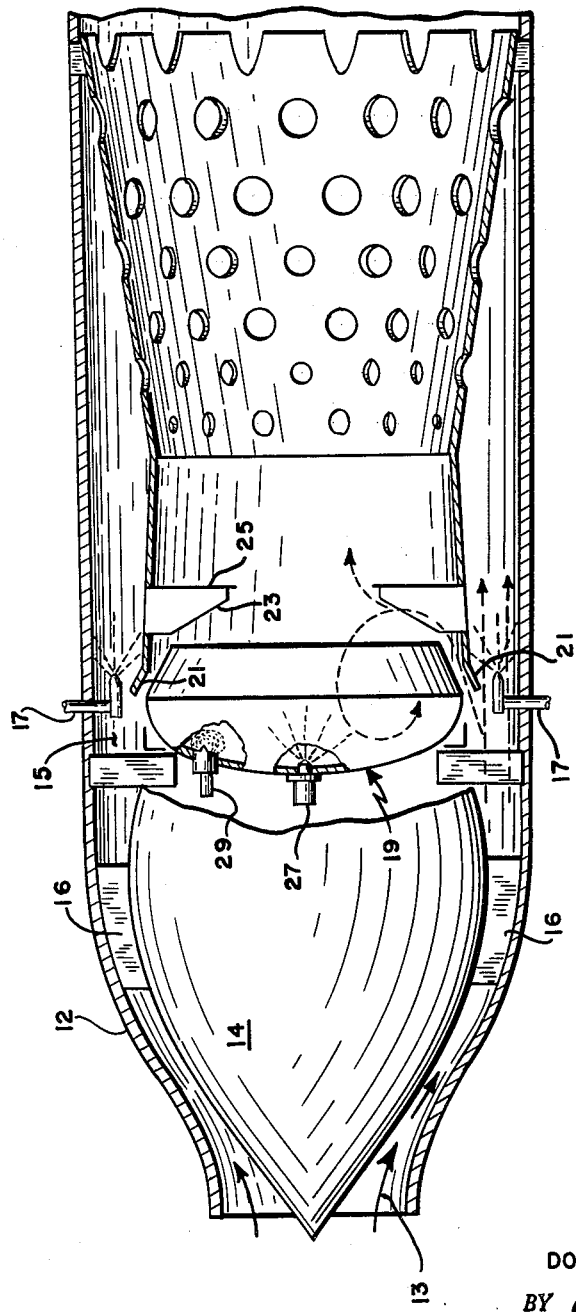
FIG. 1 is a schematic view of the combustion system of a ramjet engine incorporating the present invention.

Referring to FIG. 1, the type of engine illustrated is of the athodyd type, popularly known as a ramjet. It generally includes an open ended entry duct 13 formed between an outer wall 12 and a center-body 14 supported therein by the supports 16 through which the rammed air enters the diffuser or mixing section 15 and mixes with the fuel injected through the main fuel injector nozzles 17. In the conventional engine the fuel-air mixture would then move along to the combustion chamber where it would be ignited and burned causing the development of a thrust force.

In the engine illustrated, however, a portion of the air stream is diverted into an inner conical pilot can 19 located in the diffuser section 15. Air scoops 21 located just beyond the diffuser section on the forward periphery of the burner can pick up a small portion of air from the main stream and divert it into contact with a series of swirl vanes 23 which are attached to a restrictor plate 25. The swirl vanes 23 act to swirl most of the diverted air which then enters the pilot can 19 where it is mixed with fuel entering through the pilot fuel nozzle 27. A portion of the swirled air passes directly into the combustion chamber.

Inserted through the upstream wall of the pilot can 19 is a spark plug 29 which operates to ignite the fuel-air mixture in the inner conical can. It is obvious that the combustible mixture in this zone is relatively quiescent compared to the movement of the main air stream into the combustion chamber. As a result, the initiation of ignition of the mixture is more easily accomplished and the flame is considerably more substantial allowing more effective ignition of the fuel-air mixture in the remainder of the burner.

Figure 2:
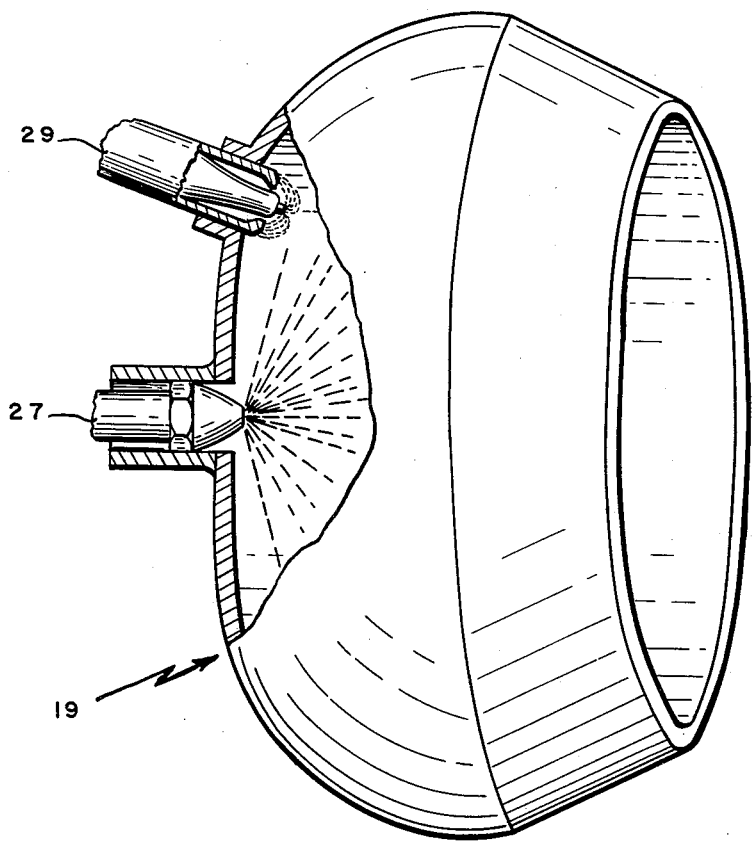
FIG. 2 is a view in partial section of the inner conical can which acts as a pilot burner.

Details of the spark plug 29 and the pilot fuel nozzle 27 are more clearly shown in FIG. 2. It will be observed that the pilot can 19 has a frusto-conical discharge outlet of convergent form so that the air that is captured by the air scoops 21 is diffused (slowed in velocity) prior to entering the pilot can 19. By using my invention, the temperature at the base of the pilot can is decreased thus the useful life of the spark plug and associated lead wire is extended.

Figure 3:
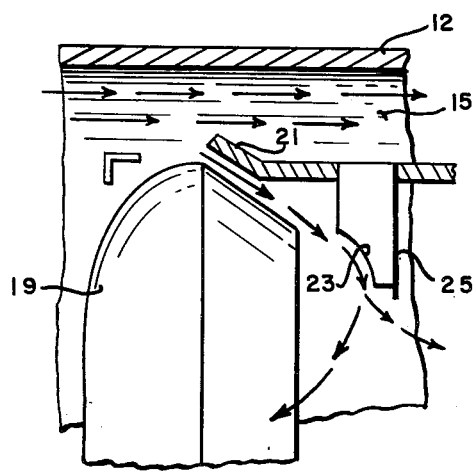
FIG. 3 is an enlarged view of an area which shows in detail the action of the air scoops and swirl vanes on the main air stream.

The path of the air stream in the region of the air scoops 21 and pilot can 19 is shown in detail in FIG. 3. Excellent combustion is obtained with this construction. A pilot flame which is conical in shape is formed and a strong flame front is obtained. The flame front then generates sufficient heat to ignite the main fuel-air mixture in the combustion chamber. The problem of incomplete combustion at the center of the combustion chamber is eliminated by using the present invention because combustion will ordinarily proceed from the center toward the outer wall. The propagation of a firm flame front which rapidly extends completely across the combustion chamber is accomplished by the combustion system shown in FIG. 1, and unusually smooth and efficient operation of the engine is obtained thereby.

It is readily apparent that this invention can be adapted to be used with any size or type of presently known ramjet power plants. Also, since the afterburners of turbojet power plants operate on a similar principle to the ramjet engine, the invention can be used therewith to substantially improve the altitude ignition performance of the afterburner.

It is to be understood that the form of my invention shown and described herein, is to be taken as a preferred embodiment of the same and it will be apparent that various changes in construction, including shape, size, and arrangement of the parts, may be made without departing from the true spirit and scope of the invention. For example, this system could be operated quite satisfactorily if the swirl vanes 23 and/or the frusto-conical discharge section of the pilot can 19 were eliminated.

What I claim as new and desire to secure by Letters Patent is:

1. In a combustion system for a jet propulsion device having an inner and an outer casing, an open ended entry duct in said outer casing for admitting a primary high velocity stream of air, a diffuser section within said air entrance having a center-body disposed therein, said center-body being held in position by a plurality of supporting members, a pilot can having a closed upstream end disposed immediately aft of said diffuser section, said pilot can having a frusto-conically shaped converging annular wall member forming its downstream terminal portion with a central opening therein to allow a converging conical pilot flame to emerge therefrom, means for diverting and directing a relatively small portion of the primary air stream into the downstream opening of said pilot can, injector means for introducing combustible fluid through the upstream wall of said pilot can, spark means for igniting the mixture of combustible fluid and air in said pilot can, a plurality of fuel injectors disposed in the undiverted portion of the primary air stream leaving the diffuser section and pointed in the downstream direction, and a combustion chamber downstream of said pilot can for receiving the primary combustible mixture of fuel and air, said combustible mixture being ignited by the pilot flame emerging from the downstream opening in said pilot can.

2. The jet combustion system defined in claim 1 wherein the means for diverting a portion of the primary air stream includes a series of air scoops extending into the air stream, said air scoops being positioned on the forward end of the inner casing near the opening in the pilot can, said air scoops operating to direct a portion of the air stream into the upstream area of said combustion chamber at the opening in said pilot can.

3. In a combustion system for a jet propulsion device, an open ended entry duct for admitting a high velocity stream of air, a diffuser section within said entry duct for compressing the incoming air, air scoops having angular lip portions protruding into the air stream, said air scoops being located downstream of said diffuser section for diverting and directing a portion of the incoming air stream toward the axial center of the propulsion device, a pilot can having a closed upstream end and a frusto-conically shaped converging annular wall member forming its downstream terminal portion with a central opening therein to allow a converging conical pilot flame to emerge therefrom, said pilot can being located adjacent to the downstream end of said diffuser section, swirl vanes for swirling a portion of the diverted air in the area of the downstream opening in said pilot can, a pilot fuel injector disposed in the upstream wall of said pilot can for injecting a combustible fluid into said pilot can, a spark plug disposed in the upstream wall of said pilot can for igniting the mixture of combustible fluid and air, a plurality of primary fuel injectors disposed in the primary air stream for creating a combustible fuel-air mixture, and a combustion chamber downstream of said pilot can for receiving the primary fuel-air mixture, said primary fuel-air mixture being ignited by the pilot flame emerging from the downstream opening in said pilot can.

References Cited in the file of this patent

UNITED STATES PATENTS

| | | |
|---|---|---|
| 2,531,810 | Fyffe | Nov. 28, 1950 |
| 2,635,426 | Meschino | Apr. 21, 1953 |
| 2,798,360 | Hazen | July 9, 1957 |
| 2,861,420 | Lewis | Nov. 25, 1958 |
| 2,927,427 | Mestre | Mar. 8, 1960 |
| 2,930,192 | Johnson | Mar. 29, 1960 |
| 2,931,174 | Allen | Apr. 5, 1960 |
| 2,931,175 | Jamison et al. | Apr. 5, 1960 |
| 2,944,398 | Naegele | July 12, 1960 |